US012772267B2

(12) United States Patent
Zhang et al.

(10) Patent No.: US 12,772,267 B2

(45) Date of Patent: Oct. 20, 2026

(54) DATA TRANSMISSION METHOD APPLIED TO SHORT-RANGE WIRELESS COMMUNICATION AND COMMUNICATION APPARATUS

(71) Applicant: HUAWEI TECHNOLOGIES CO., LTD., Shenzhen (CN)

(72) Inventors: Shengjie Zhang, Shanghai (CN); Tao Huang, Shanghai (CN); Zhepeng Ma, Shenzhen (CN)

(73) Assignee: Huawei Technologies Co., LTD., Shenzhen (CN)

(*) Notice: Subject to any disclaimer, the term of this patent is extended or adjusted under 35 U.S.C. 154(b) by 288 days.

(21) Appl. No.: 18/442,384

(22) Filed: Feb. 15, 2024

(65) Prior Publication Data

US 2024/0188106 A1 Jun. 6, 2024

Related U.S. Application Data

(63) Continuation of application No. PCT/CN2021/115161, filed on Aug. 27, 2021.

(51) Int. Cl.
*H04W 72/30* (2023.01)
*H04W 72/0446* (2023.01)

(52) U.S. Cl.
CPC ....... *H04W 72/30* (2023.01); *H04W 72/0446* (2013.01)

(58) Field of Classification Search
CPC ........... H04W 40/023; H04W 72/0446; H04W 72/30; H04W 4/80; H04L 1/08; H04L 2001/0093; H04L 69/28
See application file for complete search history.

(56) References Cited

U.S. PATENT DOCUMENTS

| | | | | |
|---|---|---|---|---|
| 2009/0232041 A1* | 9/2009 | Smith | ................. | H04W 12/041 370/312 |
| 2014/0348327 A1* | 11/2014 | Linde | ...................... | H04W 4/80 381/2 |
| 2017/0127445 A1* | 5/2017 | Lee | ...................... | H04W 76/19 |

(Continued)

FOREIGN PATENT DOCUMENTS

| | | |
|---|---|---|
| CN | 101459662 A | 6/2009 |
| CN | 103858363 A | 6/2014 |

(Continued)

OTHER PUBLICATIONS

Lee, "Broadcast Audio Transmission for Bluetooth LE on an Interfered ISM Band," IEEE Internet of Things Journal, vol. 6, No. 4, Aug. 1, 2019, pp. 6140-6150.

(Continued)

*Primary Examiner* — Brian D Nguyen

(74) *Attorney, Agent, or Firm* — Fish & Richardson P.C.

(57) ABSTRACT

Example data transmission methods and apparatus are described. In one example method, a primary device sends a first data packet to a plurality of secondary devices. The primary device separately receives first identification information that is fed back by a respective one of the plurality of secondary devices and that indicates whether a corresponding secondary device successfully receives corresponding first data from the first data packet. The primary device selectively resends the first data packet based on the first identification information.

20 Claims, 8 Drawing Sheets

(56) References Cited

U.S. PATENT DOCUMENTS

| | | | | |
|---|---|---|---|---|
| 2017/0353365 | A1* | 12/2017 | Li | H04L 43/04 |
| 2018/0167885 | A1* | 6/2018 | Tanaka | H04W 52/0219 |
| 2019/0007115 | A1* | 1/2019 | Luong | H04B 7/0658 |
| 2023/0371095 | A1* | 11/2023 | Yao | H04W 76/14 |

FOREIGN PATENT DOCUMENTS

| | | | |
|---|---|---|---|
| CN | 104426640 | A | 3/2015 |
| CN | 108616818 | A | 10/2018 |
| CN | 111859993 | A | 10/2020 |
| CN | 112994754 | A | 6/2021 |
| WO | 2020154938 | A1 | 8/2020 |

OTHER PUBLICATIONS

Extended European Search Report in European Appln No. 21954642.1, dated Jul. 23, 2024, 9 pages.

Bluetooth SIG Proprietary, "Bluetooth Core Specification, Revision: v5.2," Dec. 31, 2019, 3289 pages.

International Search Report and Written Opinion in International Appln. No. PCT/CN2021/115161, mailed on Apr. 28, 2022, 17 pages (with English translation).

* cited by examiner

DATA TRANSMISSION METHOD APPLIED TO SHORT-RANGE WIRELESS COMMUNICATION AND COMMUNICATION APPARATUS

CROSS-REFERENCE TO RELATED APPLICATIONS

This application is a continuation of International Application No. PCT/CN2021/115161, filed on Aug. 27, 2021, the disclosure of which is hereby incorporated by reference in its entirety.

TECHNICAL FIELD

This application relates to the field of communication technologies, and in particular, to a data transmission method applied to short-range wireless communication and a communication apparatus.

BACKGROUND

With continuous development of a Bluetooth technology, electronic devices having a Bluetooth function are widely applied. One electronic device (also referred to as a primary device) may establish a Bluetooth connection to one or more electronic devices (also referred to as secondary devices). A Bluetooth connection established between one electronic device and a plurality of electronic devices may be referred to as one-to-many transmission for short.

For the plurality of devices that perform one-to-many transmission based on the Bluetooth technology, only a primary device can send data to a plurality of secondary devices, and the secondary device cannot send data to the primary device. For example, in a broadcast isochronous stream (BIS)-based broadcast transmission manner, the primary device performs one-way communication with the plurality of secondary devices. In other words, the primary device is only responsible for sending data to the plurality of secondary devices. The secondary devices are only configured to receive the data from the primary device, and cannot send data to the primary device. In addition, in the BIS-based broadcast manner, the primary device needs to repeatedly send the data to the plurality of secondary devices for a plurality of times. In some cases, if each secondary device has received the data from the primary device at a time, the primary device still needs to resend the data to the plurality of secondary devices for a plurality of times, causing a waste of signaling.

SUMMARY

This application provides a data transmission method applied to short-range wireless communication and a communication apparatus, to improve reliability of data transmission between a primary device and secondary devices.

To achieve the foregoing objective, this application uses the following technical solutions.

According to a first aspect, a data transmission method applied to short-range wireless communication is provided. The method includes: A primary device sends at least one piece of first data corresponding to a plurality of first secondary devices to the plurality of first secondary devices. The primary device receives first identification information fed back by the plurality of first secondary devices. A first identifier in each piece of first identification information indicates whether the corresponding first secondary device successfully receives the corresponding first data from a first data packet. The primary device selectively resends the first data packet based on a plurality of pieces of first identification information.

According to the data transmission method applied to short-range wireless communication that is provided in the first aspect, the primary device may simultaneously send data to the plurality of secondary devices. Each secondary device may further feed back a data receiving status to the primary device. In this way, the primary device may determine the data receiving status of each secondary device based on the data receiving status fed back by the secondary device. Therefore, reliability of data transmission between the primary device and the secondary devices is ensured. In addition, the primary device may selectively resend the data based on the data receiving status fed back by each secondary device. Compared with the conventional technology, this can reduce signaling overheads.

In a possible implementation, the primary device sends the first data packet to the plurality of first secondary devices in a first slot in an event period.

Based on this possible implementation, the primary device may simultaneously send the first data packet to the plurality of first secondary devices. In this way, latency in receiving the data by each secondary device can be reduced.

In a possible implementation, the primary device receives the first identification information in a plurality of second slots in an event period in a time division manner.

Based on this possible implementation, the plurality of secondary devices may sequentially feed back the first identification information to the primary device, to avoid signal interference between the secondary devices.

In a possible implementation, the primary device resends the first data packet when any piece of first identification information indicates that the corresponding first secondary device fails to receive target data. The target data is the first data that is in the first data packet and that corresponds to the first secondary device. Alternatively, the primary device sends a second data packet when the plurality of pieces of first identification information indicate that the corresponding first secondary devices successfully receive the target data.

Based on this possible implementation, the primary device may accurately determine, based on the data receiving statuses of the plurality of secondary devices, whether to resend the first data packet or send a new second data packet. This can prevent the primary device from repeatedly sending the data when all the secondary devices have received the data.

In a possible implementation, when data corresponding to the plurality of first secondary devices is the same, the first data packet includes one piece of first data; or when data corresponding to the plurality of first secondary devices is different, the first data packet includes a plurality of pieces of first data respectively corresponding to the plurality of first secondary devices.

Based on this possible implementation, when data needed by the plurality of secondary devices is the same, the primary device may simultaneously send one piece of data to the plurality of secondary devices. In this way, resources needed for data transmission can be reduced. When data needed by the plurality of secondary devices is different, the primary device may send the needed data to the plurality of secondary devices at a time. This reduces data sending time.

In a possible implementation, the primary device sends, to a second secondary device, a null packet used to maintain a communication connection to the second secondary device.

Based on this possible implementation, the primary device may maintain the communication connection to the second secondary device by sending the null packet.

In a possible implementation, the primary device separately sends, to the plurality of first secondary devices, second identification information that indicates whether the primary device successfully receives the first identification information of the corresponding first secondary device.

Based on this possible implementation, the primary device may feed back, to each secondary device, whether the corresponding first identification information is successfully received. This ensures reliability of a process in which the secondary devices feed back information to the primary device.

In a possible implementation, at least one of second slots, frequencies, or channels corresponding to first identification information of adjacent secondary devices is preconfigured.

Based on this possible implementation, the plurality of secondary devices may send the identification information to the primary device based on the configured second slots, frequencies, or channels. This is accurate and convenient.

According to a second aspect, a communication apparatus is provided. The communication apparatus is used in a primary device or a chip or a system-on-a-chip in the primary device, or may be a function module that is in the primary device and that is configured to implement the method according to any one of the first aspect or the possible designs of the first aspect. The communication apparatus may implement a function performed by the primary device in the foregoing aspects or possible designs, and the function may be implemented by hardware by executing corresponding software. The hardware or the software includes one or more modules corresponding to the function. For example, the communication apparatus includes a processor and a communication interface.

The processor is configured to: send a plurality of pieces of first data that respectively correspond to a plurality of first secondary devices to the plurality of first secondary devices through the communication interface; receive, through the communication interface, first identification information fed back by the plurality of first secondary devices, where a first identifier of each piece of first identification information indicates whether the corresponding first secondary device successfully receives the corresponding first data from a first data packet; and selectively resend the first data packet based on the plurality of pieces of first identification information through the communication interface.

For a specific implementation of the communication apparatus, refer to a behavior and a function of the primary device in the data transmission method applied to short-range wireless communication that is provided in any one of the first aspect or the possible designs of the first aspect. Details are not described herein again. Therefore, the provided communication apparatus can achieve a same beneficial effect as any one of the first aspect or the possible designs of the first aspect.

According to a third aspect, a communication apparatus is provided. The communication apparatus may be a primary device or a chip or a system-on-a-chip in the primary device. The communication apparatus may implement a function performed by the primary device in the foregoing aspects or possible designs. The function may be implemented by hardware. For example, in a possible design, the communication apparatus may include a processor and a communication interface. The processor may be configured to support the communication apparatus in implementing the function in any one of the first aspect or the possible designs of the first aspect. For example, the processor is configured to send a plurality of pieces of first data that respectively correspond to a plurality of first secondary devices to the plurality of first secondary devices through the communication interface.

In another possible design, the communication apparatus may further include a memory. The memory is configured to store computer-executable instructions and data that are necessary for the communication apparatus. When the communication apparatus runs, the processor executes the computer-executable instructions stored in the memory, to enable the communication apparatus to perform the method according to any one of the first aspect or the possible designs of the first aspect.

According to a fourth aspect, a computer-readable storage medium is provided. The computer-readable storage medium may be a non-volatile readable storage medium. The computer-readable storage medium stores computer instructions or a program. When the computer instructions or the program are/is run on a computer, the computer is enabled to perform the method according to any one of the first aspect or the possible designs of the foregoing aspects.

According to a fifth aspect, a communication apparatus is provided. The communication apparatus may be a primary device or a chip or a system-on-a-chip in the primary device. The communication apparatus includes one or more processors and one or more memories. The one or more memories are coupled to the one or more processors. The one or more memories are configured to store computer program code. The computer program code includes computer instructions, and when the one or more processors execute the computer instructions, the primary device is enabled to perform the method according to any one of the first aspect or the possible designs of the first aspect.

According to a sixth aspect, a computer program product including instructions is provided. When the computer program product runs on a computer, the computer is enabled to perform the method according to any one of the first aspect or the possible designs of the foregoing aspects.

According to a seventh aspect, a chip system is provided. The chip system includes a processor and a communication interface. The chip system may be configured to implement functions performed by the primary device in any one of the first aspect or the possible designs of the first aspect. For example, the processor is configured to send a plurality of pieces of first data that respectively correspond to a plurality of first secondary devices to the plurality of first secondary devices through the communication interface. In a possible design, the chip system further includes a memory. The memory is configured to store program instructions and/or data. The chip system may include a chip, or may include a chip and another discrete device. This is not limited herein.

For a technical effect achieved by any one of design manners of the second aspect to the seventh aspect, refer to the technical effect achieved by any one of the first aspect or the possible designs of the first aspect. Details are not described again.

According to an eighth aspect, a data transmission method applied to short-range wireless communication is provided. The method is applied to first secondary devices and includes: The first secondary device receives, in a first slot in an event period, a first data packet that is from a primary device and that includes at least one piece of first data respectively corresponding to the plurality of first secondary devices. The first secondary device feeds back, in any one of second slots in the event period, first indication information that indicates whether the first secondary device successfully receives the corresponding first data from the first data packet. Different first secondary devices correspond to different second slots.

Based on the method provided in the eighth aspect, the primary device may simultaneously send data to the plurality of secondary devices. Each secondary device may further feed back a data receiving status to the primary device. In this way, the primary device may determine the data receiving status of each secondary device based on the data receiving status fed back by the secondary device. Therefore, reliability of data transmission between the primary device and the secondary devices is ensured. In addition, the primary device may selectively resend the data based on the data receiving status fed back by each secondary device. Compared with the conventional technology, this can reduce signaling overheads.

In a possible implementation, when data corresponding to the plurality of first secondary devices is the same, the first data packet includes one piece of first data; or when data corresponding to the plurality of first secondary devices is different, the first data packet includes a plurality of pieces of first data respectively corresponding to the plurality of first secondary devices.

Based on this possible implementation, when data needed by the plurality of secondary devices is the same, the primary device may simultaneously send one piece of data to the plurality of secondary devices. In this way, resources needed for data transmission can be reduced. When data needed by the plurality of secondary devices is different, the primary device may send the needed data to the plurality of secondary devices at a time. This reduces data sending time.

In a possible implementation, the first data packet further includes a null packet used to maintain a communication connection to a second secondary device.

Based on this possible implementation, the primary device may maintain the communication connection to the second secondary device by sending the null packet.

In a possible implementation, the first secondary devices receive second identification information that is from the primary device and that indicates whether the primary device has received the corresponding first identification information.

Based on this possible implementation, the secondary devices may determine, based on the identification information fed back by the primary device, a data receiving status of the primary device. This ensures reliability of two-way data transmission between the primary device and the secondary devices.

In a possible implementation, at least one of second slots, frequencies, or channels corresponding to first identification information of adjacent first secondary devices is preconfigured.

Based on this possible implementation, the plurality of secondary devices may send the identification information to the primary device based on the configured slots, frequencies, or channels. This is accurate and convenient.

According to a ninth aspect, a communication apparatus is provided. The communication apparatus is used in a secondary device or a chip or a system-on-a-chip in the secondary device, or may be a function module that is in the secondary device and that is configured to implement the method according to any one of the eighth aspect or the possible designs of the eighth aspect. The communication apparatus may implement a function performed by the secondary device in the foregoing aspects or possible designs, and the function may be implemented by hardware by executing corresponding software. The hardware or the software includes one or more modules corresponding to the function. For example, the communication apparatus includes a processor and a communication interface.

The processor is configured to: receive, through the communication interface, a first data packet that is from a primary device and that includes a plurality of pieces of first data respectively corresponding to a plurality of first secondary devices; and feed back, to the primary device through the communication interface, first identification information that indicates whether the first secondary device successfully receives the corresponding first data from the first data packet. Different first secondary devices correspond to different second slots.

For a specific implementation of the communication apparatus, refer to a behavior and a function of the secondary device in the data transmission method applied to short-range wireless communication that is provided in any one of the second aspect or possible designs of the second aspect. Details are not described herein again. Therefore, the provided communication apparatus can achieve a same beneficial effect as any one of the second aspect or the possible designs of the second aspect.

According to a tenth aspect, a communication apparatus is provided. The communication apparatus may be a secondary device or a chip or a system-on-a-chip in the secondary device. The communication apparatus may implement a function performed by the primary device in the foregoing aspects or possible designs. The function may be implemented by hardware. For example, in a possible design, the communication apparatus may include a processor and a communication interface. The processor may be configured to support the communication apparatus in implementing the function in any one of the eighth aspect or the possible designs of the eighth aspect. For example, the processor is configured to receive, through the communication interface, a first data packet that is from the primary device and that includes a plurality of first data respectively corresponding to a plurality of first secondary devices.

In another possible design, the communication apparatus may further include a memory. The memory is configured to store computer-executable instructions and data that are necessary for the communication apparatus. When the communication apparatus runs, the processor executes the computer-executable instructions stored in the memory, to enable the communication apparatus to perform the method according to any one of the second aspect or the possible designs of the second aspect.

According to an eleventh aspect, a computer-readable storage medium is provided. The computer-readable storage medium may be a non-volatile readable storage medium. The computer-readable storage medium stores computer instructions or a program. When the computer instructions or the program are/is run on a computer, the computer is enabled to perform the method according to any one of the eighth aspect or the possible designs of the eighth aspect.

According to a twelfth aspect, a communication apparatus is provided. The communication apparatus may be a secondary device or a chip or a system-on-a-chip in the secondary device. The communication apparatus includes one or more processors and one or more memories. The one or more memories are coupled to the one or more processors. The one or more memories are configured to store computer program code. The computer program code includes computer instructions, and when the one or more processors execute the computer instructions, the primary device is enabled to perform the method according to any one of the eighth aspect or the possible designs of the eighth aspect.

According to a thirteenth aspect, a computer program product including instructions is provided. When the computer program product runs on a computer, the computer is enabled to perform the method according to any one of the eighth aspect or the possible designs of the eighth aspect.

According to a fourteenth aspect, a chip system is provided. The chip system includes a processor and a communication interface. The chip system may be configured to implement functions performed by the secondary device in any one of the eighth aspect or possible designs of the eighth aspect. For example, the processor is configured to receive, through the communication interface, a first data packet that is sent by a primary device on a first resource unit and that includes an identifier of the primary device and first data. In a possible design, the chip system further includes a memory. The memory is configured to store program instructions and/or data. The chip system may include a chip, or may include a chip and another discrete device. This is not limited herein.

For a technical effect achieved by any one of design manners of the ninth aspect to the fourteenth aspect, refer to the technical effect achieved by any one of the first aspect or the possible designs of the first aspect. Details are not described again.

According to a fifteenth aspect, this application provides a communication system, including a primary device and a plurality of secondary devices that communicate with the primary device. The primary device is configured to perform the data transmission method applied to short-range wireless communication that is described in any one of the first aspect or the possible implementations of the first aspect. The secondary devices are configured to perform the method described in any one of the eighth aspect or the possible implementations of the eighth aspect.

DESCRIPTION OF EMBODIMENTS

With development of a Bluetooth technology, data communication between electronic devices may be implemented through Bluetooth. For example, a primary device (or a primary node) may establish Bluetooth connections to a plurality of secondary devices (or secondary nodes). Further, the primary device may send data to the plurality of secondary devices. A process in which the primary device sends the data to the plurality of secondary devices may be referred to as one-to-many transmission for short.

Generally, to send the data to the plurality of secondary devices, the primary device may send the data to the plurality of secondary devices in a broadcast-based manner. Although the one-to-many transmission can be implemented in this manner, because the secondary devices cannot feed back data receiving statuses to the primary device, reliability of data transmission is low in this manner.

Figure 1:
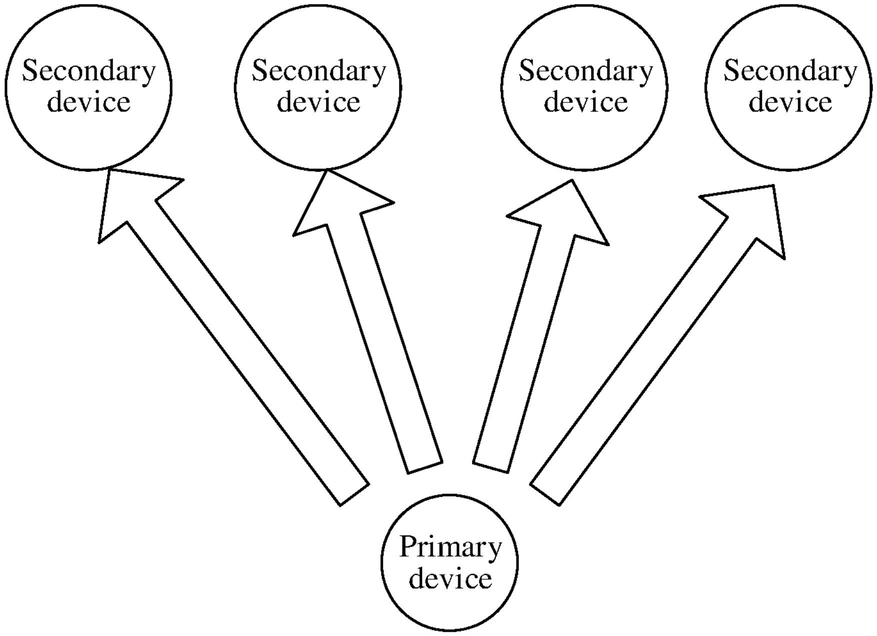
FIG. 1 is a schematic diagram of a data transmission method applied to short-range wireless communication according to an embodiment of this application.

For example, the broadcast-based manner may be a broadcast isochronous stream (BIS)-based broadcast transmission manner. FIG. 1 shows a communication system based on a BIS-based broadcast transmission manner. The communication system may include a primary device and a plurality of secondary devices (where only four secondary devices are shown in the figure). Communication connections are established between the primary device and the plurality of secondary devices.

In FIG. 1, the primary device implements one-way communication with the plurality of secondary devices. In other words, the primary device is only responsible for sending data to the plurality of secondary devices. The secondary devices are only configured to receive the data from the primary device, and cannot send data or send feedback information to the primary device. Therefore, the primary device cannot obtain a receiving status of each secondary device. When interference of an environment in which the secondary devices are located affects data receiving of the secondary devices, reliability of the BIS-based broadcast transmission manner is poor.

In addition, in the BIS-based broadcast transmission manner, to enable each secondary device to receive the data from the primary device as much as possible, the primary device may repeatedly send the data to the plurality of secondary devices for a plurality of times. For example, a quantity of times that the primary device repeatedly sends the data may be preconfigured, for example, may be 4 or 5. This is not limited.

Figure 2:
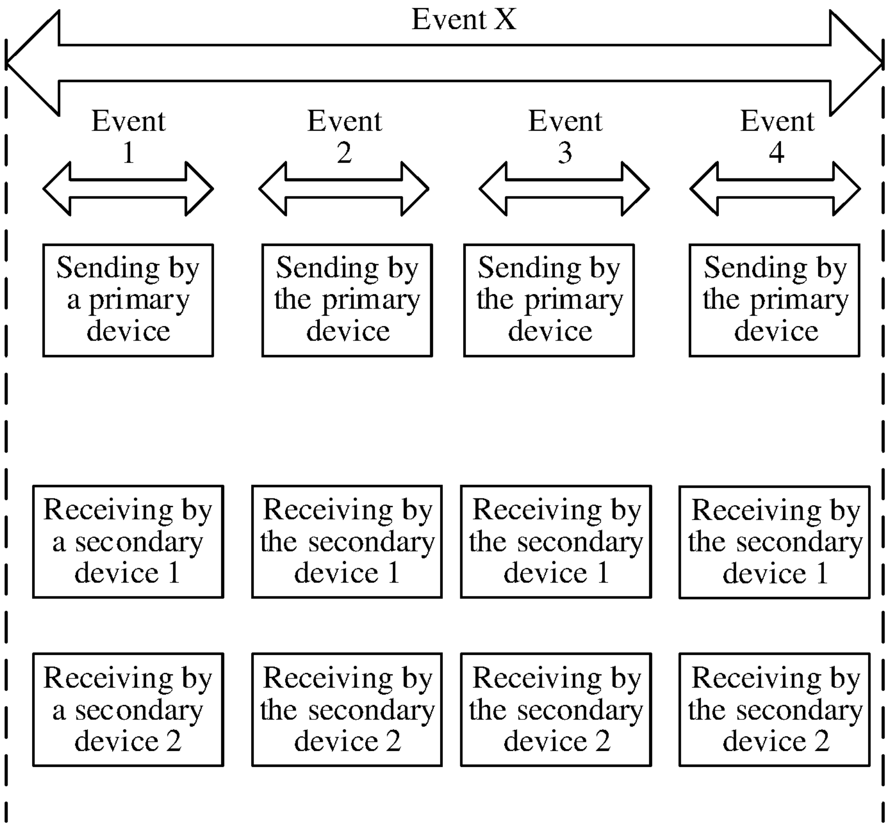
FIG. 2 is another schematic diagram of a data transmission method applied to short-range wireless communication according to an embodiment of this application.

For example, there are two secondary devices (which respectively are a secondary device 1 and a secondary device 2), and the quantity of sending times of the primary device is 4. As shown in FIG. 2, the primary device needs to simultaneously send the data to the two secondary devices, and needs to send the same data for four times. Correspondingly, the secondary device 1 and the secondary device 2 need to repeatedly receive the same data from the primary device for four times. In this way, in this solution, when the primary device sends the data for the first time, even if all the secondary devices have received the data, the primary device still needs to resend the data. This increases power consumption of the primary device.

Figure 3:
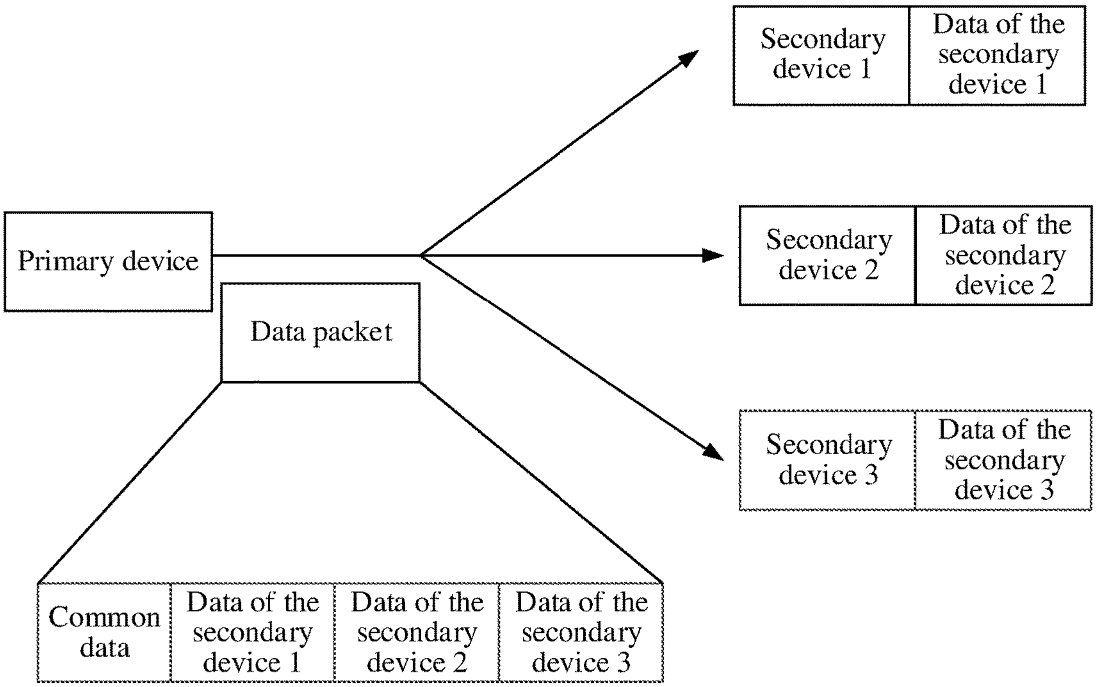
FIG. 3 is another schematic diagram of a data transmission method applied to short-range wireless communication according to an embodiment of this application.

In an embodiment, when a primary device separately sends different data to a plurality of secondary devices, as shown in FIG. 3, the primary device needs to encapsulate the data to be sent to the plurality of secondary devices into a data packet. The data packet may include data needed by secondary devices of a plurality of users (for example, data of a secondary device 1, data of a secondary device 2, and data of a secondary device 3). Certainly, the data packet may further include other data, for example, common data. The common data may include an identifier of the primary device and the like. The data of the secondary device 1 may include an identifier of the secondary device 1, the data needed by the secondary device 1, and the like. After receiving the data packet from the primary device, each secondary device may decapsulate the data packet and obtain the needed data.

In the technical solution in FIG. 3, the primary device needs to encapsulate the data needed by the plurality of secondary devices, and then send the encapsulated data to the secondary devices. When the plurality of secondary devices need same data, if the primary device still performs data encapsulation according to this solution, the encapsulated data packet may be excessively large, and a large quantity of transmission resources (for example, air interface resources) are occupied during data packet transmission. Because the data packet includes a plurality of pieces of same data, the transmission resources are wasted.

To improve reliability of one-to-many transmission, in a possible embodiment, a primary device may sequentially send data to a plurality of secondary devices. Correspondingly, after receiving the data from the primary device, the plurality of secondary devices may send, to the primary device, feedback information that indicates data receiving statuses. The primary device may determine, based on the feedback information of the secondary devices, whether to resend the data.

Figure 4:
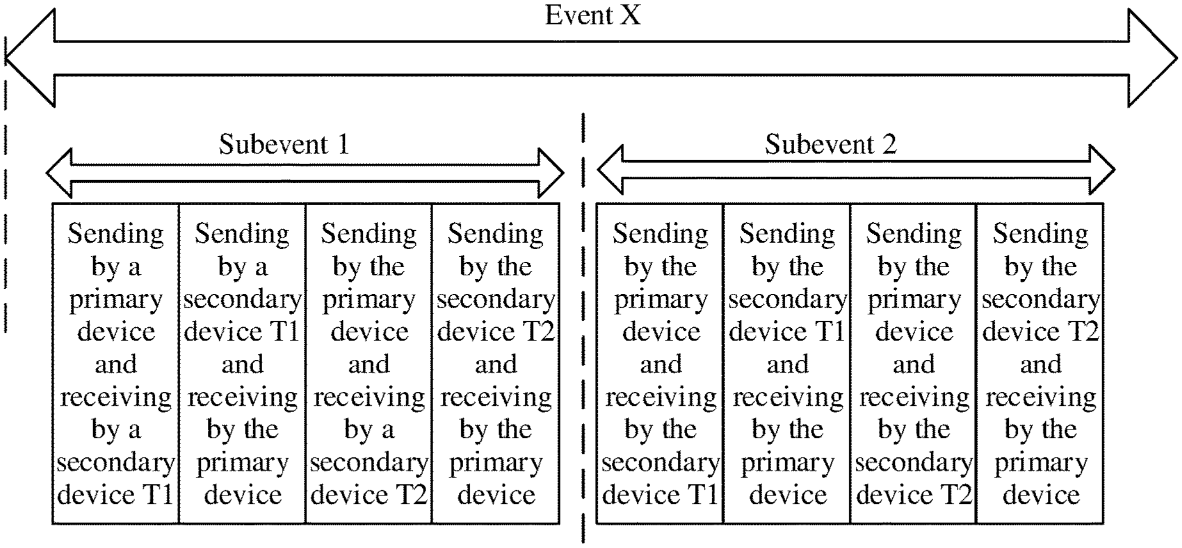
FIG. 4 is another schematic diagram of a data transmission method applied to short-range wireless communication according to an embodiment of this application.

As shown in FIG. 4, for example, there are two secondary devices, and the primary device needs to perform two data sending operations (which are respectively a subevent 1 and a subevent 2). The primary device first executes the subevent 1: The primary device first sends data to a secondary device 1. After receiving feedback information of the secondary device 1, the primary device sends the data to a secondary device 2. In this way, the primary device may determine, based on the feedback information of the secondary device 1 and feedback information of the secondary device 2, whether to resend the data. When it is determined that both the secondary device 1 and the secondary device 2 have received the data, the primary device next executes the subevent 2. For an execution process, refer to the execution process of the subevent 1. Details are not described again.

In the solution in FIG. 4, when the data received by the plurality of secondary devices is the same, the primary device needs to sequentially send the data to each secondary device. In some scenarios, latency may be increased. For example, in a scenario in which a primary device performs monophonic transmission (for example, calling), the primary device (for example, a mobile phone) needs to sequentially send same call data to a plurality of secondary devices (for example, Bluetooth headsets). Because there is a time difference when the primary device sends the call data, there is also a time difference between time of receiving the call data by the plurality of secondary devices. Therefore, there is latency in data transmission between the primary device and the plurality of secondary devices. This deteriorates user experience.

In view of this, embodiments of this application provide a data transmission method applied to short-range wireless communication. This method is applied to data transmission between a primary device and a plurality of secondary devices that establish short-range wireless communication connections, and may include: The primary device may simultaneously send a first data packet to the plurality of secondary devices, where the first data packet may include a plurality of pieces of first data respectively corresponding to the plurality of first secondary devices. The secondary devices sequentially feed back first identification information to the primary device, where each first identifier indicates whether the corresponding secondary device successfully receives the corresponding first data from the first data packet. The primary device may selectively resend the first data packet to the plurality of secondary devices based on the plurality of pieces of first identification information.

Based on the technical solution provided in embodiments of this application, the primary device may simultaneously send data to the plurality of secondary devices. Each secondary device may further feed back a data receiving status to the primary device. In this way, the primary device may determine the data receiving status of each secondary device based on the data receiving status fed back by the secondary device. Therefore, reliability of data transmission between the primary device and the secondary devices is ensured. In addition, the primary device may selectively resend the data based on the data receiving status fed back by each secondary device. Compared with the conventional technology, this can reduce signaling overheads.

The following describes implementations of embodiments of this application in detail with reference to the accompanying drawings.

The data transmission method applied to short-range wireless communication provided in embodiments of this application may be applied to any one of communication systems that support communication. The communication system may be a 3rd Generation Partnership Project (3GPP) communication system, for example, a long term evolution (LTE) mobile communication system, a 5G mobile communication system, a new radio (NR) system, an NR vehicle-to-everything (V2X) system, or another next-generation communication system, or may be a non-3GPP communication system. This is not limited. The following uses FIG. 5 as an example to describe the data transmission method applied to short-range wireless communication provided in embodiments of this application.

Figure 5:
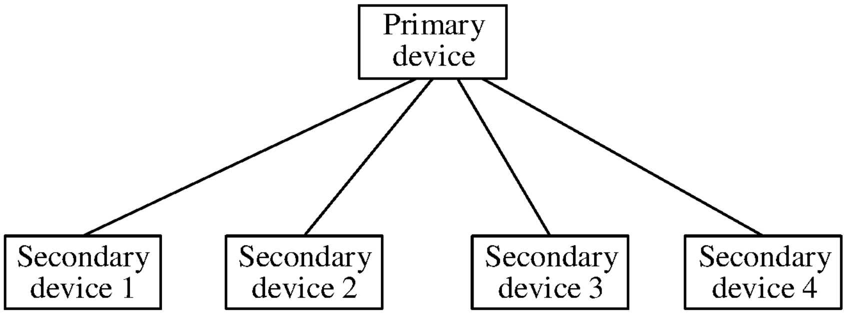
FIG. 5 is a simplified schematic structural diagram of a communication system according to an embodiment of this application.

FIG. 5 is a simplified schematic diagram of a communication system according to an embodiment of this application. As shown in FIG. 5, the communication system may include a primary device and a plurality of secondary devices (for example, a secondary device 1, a secondary device 2, a secondary device 3, and a secondary device 4). Communication connections are established between the primary device and the plurality of secondary devices. For example, the communication connections between the primary device and the plurality of secondary devices may be short-range wireless communication connections. For example, the connection may be a wireless fidelity (Wi-Fi) connection, or a Bluetooth connection, or may be another wireless communication connection. This is not limited.

The primary device in FIG. 5 may be referred to as a primary node. The primary device may be configured to send data to the plurality of secondary devices, and receive feedback information from the secondary devices. For example, the primary device may be a router, a terminal device, or user equipment (UE). The terminal device may be a wireless terminal device, a wired terminal device, a scheduled relay node, or the like. The wireless terminal device may be a device having a wireless receiving and sending function. The wireless terminal device may be deployed on the land, including an indoor device, an outdoor device, a hand-held device, or a vehicle-mounted device. The wireless terminal device may alternatively be deployed on water (for example, a steamship). The wireless terminal device may alternatively be deployed in air (for example, an airplane, a balloon, or a satellite). The terminal device may be an unmanned aerial vehicle, an internet of things (IoT) device (for example, a sensor, an electricity meter, or a water meter), a vehicle-to-everything (V2X) device, a station (ST) in a wireless local area network (WLAN), a cellular phone, a cordless phone, a session initiation protocol (SIP) telephone, a wireless local loop (WLL) station, a personal digital assistant (PDA) device, a handheld device having a wireless communication function, a computing device, or another processing device connected to a wireless modem, a vehicle-mounted device, or a wearable device (which may also be referred to as a wearable intelligent device).

The secondary device in FIG. 5 is mainly configured to receive the data from the primary device, and send the feedback information to the primary device. For example, the secondary device may be a Bluetooth headset, a Bluetooth sound box, or an intelligent terminal.

It should be noted that in the embodiment of this application, the primary device may alternatively be used as a secondary device, and the secondary device may alternatively be used as a primary device. For example, when a device 1 sends data to a device 2, the device 2 needs to feed back response information to the device 1. In this scenario, the device 1 is a primary device, and device 2 is a secondary device. For another example, when a device 2 sends data to a device 1, the device 1 needs to feed back response information to the device 2. In this scenario, the device 1 is a secondary device, and the device 2 is a primary device. For another example, the communication system in FIG. 5 further includes a third device. A communication connection is established between the third device and the secondary device 1. The secondary device 1 may send data to the third device. The third device may feed back response information to the secondary device 1. In this case, the secondary device 1 is a primary device, and the third device is a secondary device.

It should be noted that FIG. 5 is an example accompanying drawing, and a quantity of devices shown in FIG. 5 and names of interfaces between the devices in FIG. 5 are not limited. In addition to the network element shown in FIG. 5, the communication system shown in FIG. 5 may further include another device, for example, a network device. This is not limited.

Figure 6:
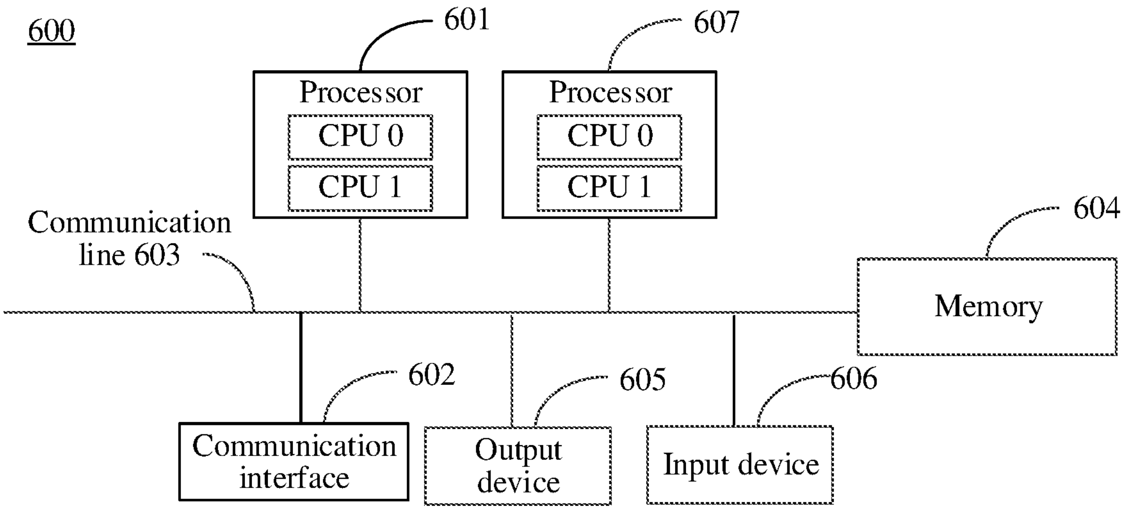
FIG. 6 is a schematic composition diagram of a communication apparatus 600 according to an embodiment of this application.

During specific implementation, the devices in FIG. 5 each may use a composition structure shown in FIG. 6, or include components shown in FIG. 6. FIG. 6 is a schematic composition diagram of a communication apparatus 600 according to an embodiment of this application. The communication apparatus 600 may be a primary device or a chip or a system-on-a-chip in the primary device. Alternatively, the communication apparatus 600 may be a secondary device or a chip or a system-on-a-chip in the secondary device. As shown in FIG. 6, the communication apparatus 600 includes a processor 601, a communication interface 602, and a communication line 603.

Further, the communication apparatus 600 may include a memory 604. The processor 601, the memory 604, and the communication interface 602 may be connected through the communication line 603.

The processor 601 is a central processing unit (CPU), a general-purpose processor network processor (NP), a digital signal processor (DSP), a microprocessor, a microcontroller, a programmable logic device (PLD), or any combination thereof. The processor 601 may alternatively be another apparatus having a processing function, for example, a circuit, a component, or a software module. This is not limited.

The communication interface 602 is configured to communicate with another device or another communication network. The another communication network may be an Ethernet, a radio access network (RAN), a wireless local area network (WLAN), or the like. The communication interface 602 may be a module, a circuit, a communication interface, or any apparatus that can implement communication.

The communication line 603 is configured to transmit information between the components included in the communication apparatus 600.

The memory 604 is configured to store instructions. The instructions may be a computer program.

The memory 604 may be a read-only memory (ROM) or another type of static storage device that can store static information and/or instructions, or may be a random access memory (RAM) or another type of dynamic storage device that can store information and/or instructions, or may be an electrically erasable programmable read-only memory (EEPROM), a compact disc read-only memory (CD-ROM), or another compact disc storage, an optical disc storage (including a compact disc, a laser disc, an optical disc, a digital versatile disc, a Blu-ray optical disc, or the like), a magnetic disk storage medium, another magnetic storage device, or the like. This is not limited.

It should be noted that the memory 604 may exist independently of the processor 601, or may be integrated with the processor 601. The memory 604 may be configured to store instructions, program code, some data, or the like. The memory 604 may be located inside the communication apparatus 600, or may be located outside the communication apparatus 600. This is not limited. The processor 601 is configured to execute the instructions stored in the memory 604, to implement a data transmission method applied to short-range wireless communication that is provided in the following embodiments of this application.

In an example, the processor 601 may include one or more CPUs, for example, a CPU 0 and a CPU 1 in FIG. 6.

In an optional implementation, the communication apparatus 600 includes a plurality of processors. For example, in addition to the processor 601 in FIG. 2, the communication apparatus 600 may further include a processor 607.

In an optional implementation, the communication apparatus 600 further includes an output device 605 and an input device 606. For example, the input device 606 is a device such as a keyboard, a mouse, a microphone, or a joystick, and the output device 605 is a device such as a display screen or a speaker.

It should be noted that the communication apparatus 600 may be a desktop computer, a portable computer, a network server, a mobile phone, a tablet computer, a wireless terminal, an embedded device, a chip system, or a device having a structure similar to the structure in FIG. 6. In addition, the composition structure shown in FIG. 6 does not constitute a limitation on a primary device and a secondary device. In addition to the components shown in FIG. 6, the primary device and the secondary device may include more or fewer components than those shown in the figure, or combine some components, or have different component arrangements.

In embodiments of this application, the chip system may include a chip, or may include a chip and another discrete device.

In addition, for actions, terms, and the like in embodiments of this application, refer to each other. This is not limited. In embodiments of this application, names of information exchanged between devices, names of parameters in the information, or the like are merely examples. During specific implementation, other names may alternatively be used. This is not limited.

In embodiments of this application, the word "example" or "for example" is used to represent giving an example, an illustration, or descriptions. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

The terms "first" and "second" mentioned below are merely intended for a purpose of description, and shall not be understood as an indication or implication of relative importance or an implicit indication of a quantity of indicated technical features. Therefore, a feature limited by "first" or "second" may explicitly or implicitly include one or more features. In descriptions of embodiments of this application, unless otherwise stated, "a plurality of" means two or more.

With reference to the communication system shown in FIG. 5, the following describes the data transmission method applied to short-range wireless communication that is provided in embodiments of this application. A primary device and a secondary device described in the following embodiments may have the components shown in FIG. 6. Details are not described again.

Figure 7:
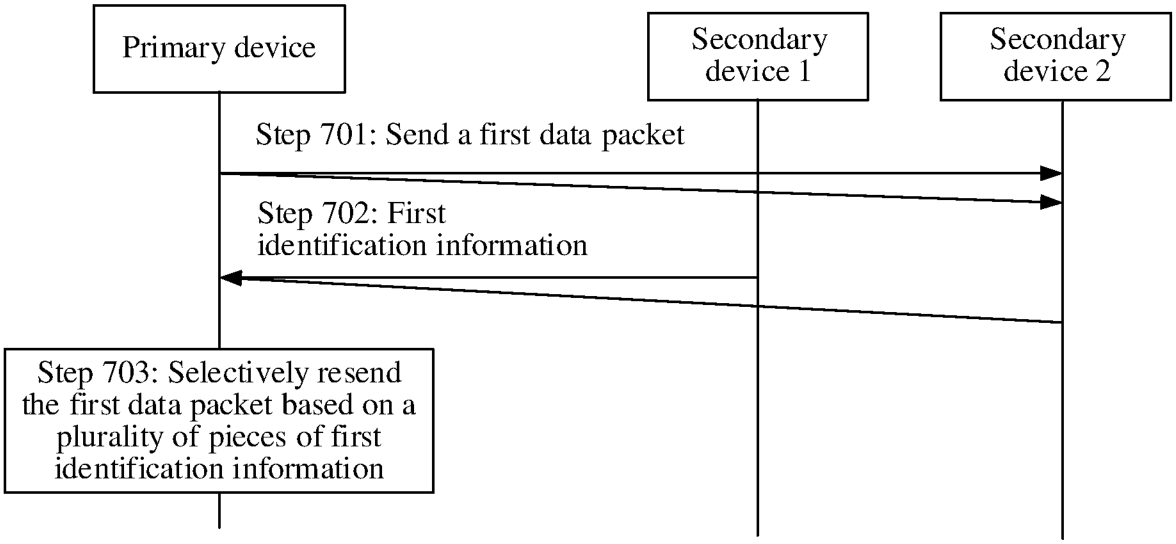
FIG. 7 is a flowchart of a data transmission method applied to short-range wireless communication according to an embodiment of this application.

FIG. 7 is a flowchart of a data transmission method applied to short-range wireless communication according to an embodiment of this application. As shown in FIG. 7, the method may include the following steps.

Step 701: A primary device sends a first data packet to a plurality of secondary devices. Correspondingly, the secondary devices receive the first data packet from the primary device.

The primary device may be the primary device in FIG. 5. The secondary device may be the secondary device in FIG. 5. For example, the plurality of secondary devices may be the secondary device 1, the secondary device 2, and the secondary device 3 in FIG. 5 (where the secondary device 1 and the secondary device 2 are only used as examples in FIG. 7 and subsequent FIG. 11).

The first data packet may include at least one piece of first data corresponding to the plurality of first secondary devices. The first data may be data that needs to be received by the plurality of secondary devices. For example, the first data may be voice data or call data. For example, with reference to FIG. 5, the first data packet may include data corresponding to the secondary device 1, data corresponding to the secondary device 2, and data corresponding to the secondary device 3.

In an example, when data needed by each secondary device is different, the first data corresponding to the secondary devices may be encapsulated into the first data packet in a form of an identifier of the secondary device+the corresponding first data. For example, the first data packet may be (A1+data 1)-(A2+data 2)-(A3+data 3). A1 is an identifier of the secondary device 1, A2 is an identifier of the secondary device 2, and A3 is an identifier of the secondary device 3.

It should be noted that an identifier of a secondary device may only identify one secondary device. The identifier of the secondary device may be further used by the primary device to determine a source device of the data. For example, the identifier of the secondary device may be a media access control (MAC) address or an internet protocol (IP) address of the secondary device.

In another example, when the plurality of secondary devices need same data, the first data packet may include one piece of data. In other words, the first data may include first data corresponding to the plurality of secondary devices. For example, the first data packet may be A1+A2+A3+data.

In still another example, when the plurality of secondary devices belong to a same set/group, the first data packet may include a group number corresponding to the plurality of secondary devices. The group number of the plurality of secondary devices may be used to identify the group to which the plurality of secondary devices belong. The group number may be a number, a character, a combination of the two, or the like. This is not limited. For example, the first data packet may be A+data. A is the group number corresponding to the plurality of secondary devices.

In a possible implementation, the primary device may send the first data packet to the plurality of secondary devices on a first resource unit. Correspondingly, each secondary device may receive the first data packet from the primary device on the first resource unit.

The first resource unit may include one or both of a first time resource and a frequency resource. The first time resource may also be referred to as a first slot. The secondary devices may receive, on the first resource unit, the data sent by the primary device. A resource unit of one or more secondary devices may be preconfigured. For example, when the primary device establishes a communication connection (for example, a Wi-Fi connection) to the one or more secondary devices, the primary device may configure the resource unit for the one or more secondary devices. For example, a time resource may be a preset time length and/or a preset time point. The secondary device may perform detection at the preset time point to detect whether the data sent by the primary device exists. Detection duration of the secondary device may be the preset time length. Alternatively, the secondary device may perform detection based on a preset time period, where the detection period is the preset time length. The preset time period may be set according to a requirement, or may be included in the time resource. This is not limited.

Figure 8:
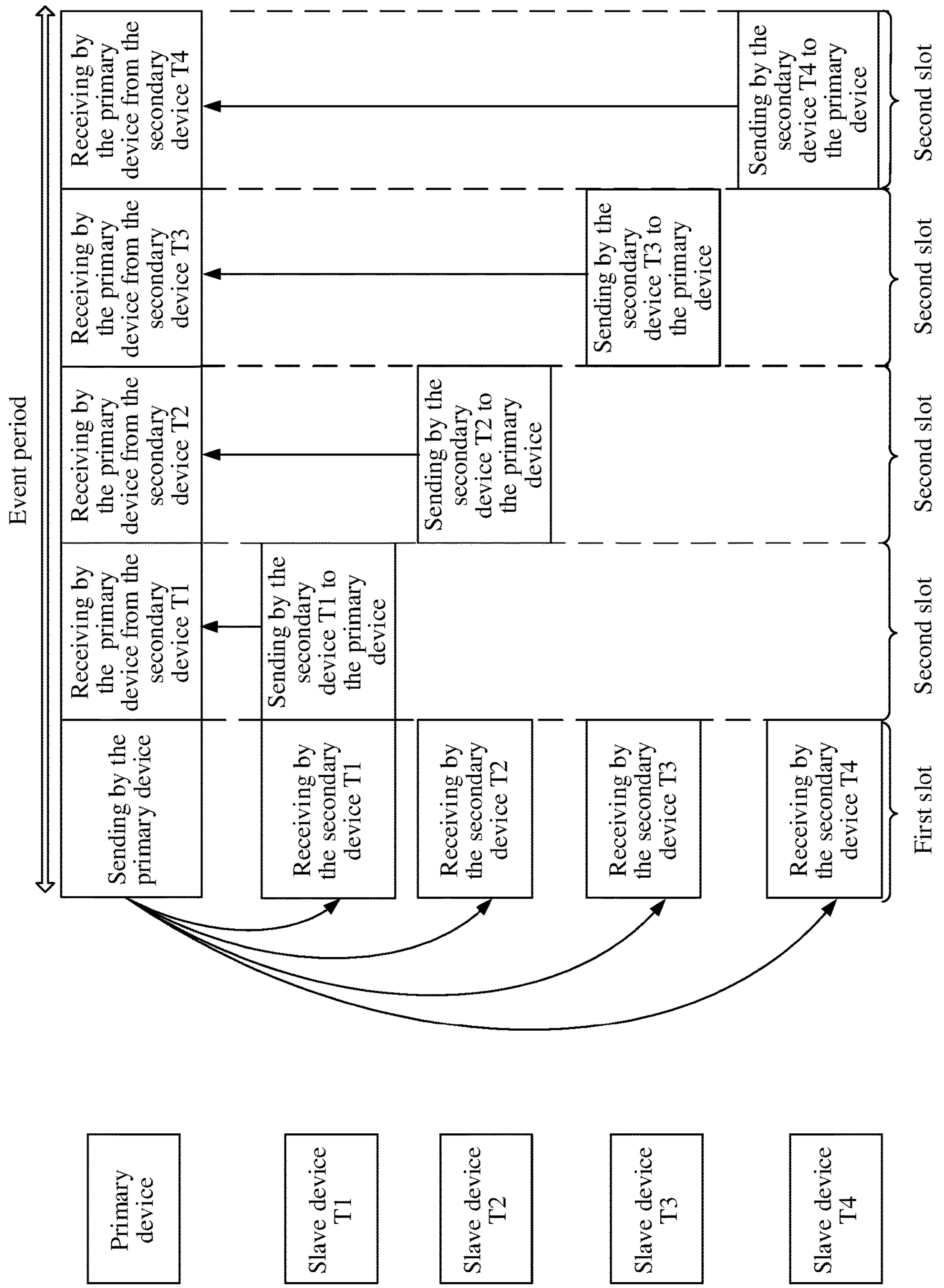
FIG. 8 is a flowchart of a data transmission method applied to short-range wireless communication according to an embodiment of this application.

In an example, the first resource unit includes the first time resource. As shown in FIG. 8, the primary device may send the first data packet to the plurality of secondary devices in the first slot in an event period. For example, the primary device may send the first data packet to a secondary device T1, a secondary device T2, a secondary device T3, and a secondary device T4 in the first slot. Correspondingly, each secondary device may receive the first data packet from the primary device in the first slot.

In another example, the first resource unit includes the frequency resource. The primary device may simultaneously send the first data packet to the plurality of secondary devices on one or more frequency resources. Correspondingly, each secondary device may receive the first data packet from the primary device on the preconfigured frequency resource. A same or different frequency resource may be preconfigured for each secondary device.

Certainly, the first data packet may further include other data. For example, the first data packet may include an identifier of the primary device. For the identifier of the primary device, refer to the foregoing descriptions of the identifier of the secondary device. Details are not described again. The first data packet may further include a null packet corresponding to the secondary device. The null packet may also be referred to as load. The null packet has no payload and includes only a channel access code and a packet header. A length of the null packet is 126 bits, and the null packet does not need to be confirmed by the secondary device.

It should be noted that the primary device sends the null packet to the secondary device to maintain a long connection (which may also be referred to as keep alive, keep alive) between the primary device and the secondary devices. For details, refer to the conventional technology. Details are not described.

It should be noted that in this embodiment of this application, that the primary device sends the first data packet to the plurality of secondary devices in the first slot in the event period may also be described as that the primary device sends the first data packet to the plurality of secondary devices simultaneously or at a same moment.

Step 702: The secondary devices feed back first identification information to the primary device. Correspondingly, the primary device receives a plurality of pieces of first identification information respectively fed back by the plurality of secondary devices.

The first identification information may also be referred to as first response information, first feedback information, or the like. The first identification information may be used to represent a status of receiving the first data by the secondary device.

In an example, the first identification information may include a first identifier, and the first identifier may indicate whether the secondary device successfully receives the corresponding first data from the first data packet. The first identifier may be a number, a letter, or a combination of a number and a letter. This is not limited.

For example, when the first data received by the secondary device is normal, the first identifier may be a first character; or when the first data received by the secondary device is abnormal, the first identifier may be a second character. The first character is different from the second character. The first character and the second character may be characters. For example, the first character is "YES" and the second character is "NO". For another example, the first character and the second character may be numbers. For example, the first character is 00, and the second character is 01. Certainly, the first character and the second character may alternatively be in another form. This is not limited.

In another example, the first identification information may include acknowledgment (ACK) information and/or negative-acknowledgment (NACK) information corresponding to the first data.

The secondary device may determine, in a manner 1 and a manner 2, whether the corresponding first data is successfully received.

Manner 1: After the secondary device receives the first data packet, if the secondary device can receive the needed first data from the first data packet and can normally use/play the first data, it indicates that the secondary device successfully receives the first data from the first data packet. If the secondary device fails to receive the first data from the first data packet, or cannot normally use/play the first data, it indicates that the secondary device fails to receive the corresponding first data.

Manner 2: The secondary device may alternatively determine, based on an operation instruction in response to an input, whether the corresponding first data is successfully received and whether the first data is normal. The operation instruction may be a voice instruction of a user, or may be a touch key instruction of the user. This is not limited. For example, when the secondary device detects that the user inputs a first operation instruction, the secondary device may determine that the received first data is normal; or when the secondary device detects that the user inputs a second operation instruction, the secondary device may determine that the received first data is abnormal. The first operation instruction is different from the second operation instruction. The first operation instruction and the second operation instruction may be set according to a requirement. This is not limited.

It should be noted that a scenario to which the foregoing manner 2 is applied may be that the secondary device can normally play the received first data, but some data frames are missing in an output process of the first data, resulting in distortion of data output by the secondary device. For example, the first data is call data, and in the output process performed by the secondary device, the call data is discontinuous or unclear.

In a possible implementation, each secondary device may feed back the first identification information to the primary device on a second resource unit in a time division manner.

The second resource unit may be preconfigured, and the second resource units configured for the secondary devices may not overlap. The second resource unit may include one or both of a second time resource and a frequency resource. The second time resource may also be referred to as a second slot. The second slot is located after the first slot.

In an example, the second resource unit includes the second time resource. As shown in FIG. 8, the primary device sends the first data packet to the secondary device T1 to the secondary device T4 in the first slot in the event period. After receiving the first data packet from the primary device, the secondary device T1 to the secondary device T4 may respectively feed back first identification information to the primary device in corresponding second slots.

In another example, the second resource unit includes the frequency resource. Each secondary device may feed back the first identification information to the primary device on the preconfigured frequency resource. The frequency resource used by each secondary device to feed back the first identification information may be the same as or different from the frequency resource used to receive the first data of the primary device. For example, the secondary device T1 may receive, on a first frequency, the first data packet sent by the primary device, and may feed back the first identification information to the primary device on the first frequency or a second frequency. The first frequency is different from the second frequency.

It should be noted that in this embodiment of this application, when the primary device establishes communication connections to the plurality of secondary devices, the primary device may determine, through interaction with the secondary devices, resource units configured for the plurality of secondary devices. A different resource unit is configured for each secondary device.

For example, the primary device may send first control information to one or more secondary devices. Correspondingly, the one or more secondary devices receive the first control information from the primary device. The first control information may indicate a resource unit on which the secondary device sends the identification information.

In an example, when the resource unit includes a time resource, a different time resource is configured for each secondary device. For example, the time resource includes a preset time length. The preset time length may be a time difference between time at which the secondary device receives data from the primary device and time at which the secondary device sends a response to the primary device. For example, the time length is 2 milliseconds (ms). In other words, after the secondary device receives the data from the primary device, the secondary device may send the first identification information to the primary device after 2 ms. The primary device may prepare to receive the identification information of the secondary device after 2 ms. Each secondary device corresponds to a different preset time length.

In another example, when the resource unit includes a frequency resource, a different or same frequency resource may be configured for each secondary device. For example, the primary device may simultaneously send data to one or more secondary devices on a same frequency resource. The one or more secondary devices may receive, on the corresponding frequency resource, the data sent by the primary device.

Further, when the plurality of secondary devices send data or information to the primary device on a same frequency resource, different time resources are configured for the plurality of secondary devices, to ensure that the plurality of secondary devices can sequentially send the data or the information to the primary device.

In another example, when the resource unit includes a frequency resource and a time resource, a different time resource is configured for each secondary device, and a same or different frequency resource may be configured for each secondary device.

It should be noted that when the primary device establishes the communication connections to the secondary devices, the primary device may further determine transmission latency between the primary device and the secondary devices based on information exchange between the primary device and the secondary devices. For example, when the primary device receives a communication connection establishment request from the secondary device, a difference between a timestamp carried in the communication connection establishment request and time at which the communication connection establishment request is received may be used as the transmission latency between the primary device and the secondary device.

Further, to improve time transmission reliability, the resource unit may further include a time period. The time period may indicate time at which the secondary device resends the identification information. For example, after the secondary device sends the first identification information to the primary device, if the secondary device has not received, within the time period, the identification information fed back by the primary device, the secondary device may resend the first identification information to the primary device. This can ensure that the primary device can receive the identification information sent by the secondary device.

Further, to enable the plurality of secondary devices to flexibly send the first identification information to the primary device, at least one of second slots, frequencies, or channels of first identification information of adjacent secondary devices is preconfigured. For example, with reference to FIG. 8, a time interval between the second slot corresponding to the secondary device T1 and the second slot corresponding to the secondary device T2, a time interval between the second slot corresponding to the secondary device T2 and the second slot corresponding to the secondary device T3, and a time interval between the second slot corresponding to the secondary device T3 and the second slot corresponding to the secondary device T4 may be preconfigured.

The secondary device T1, the secondary device T2, the secondary device T3, and the secondary device T4 may send the first identification information to the primary device on a same frequency or channel, or may send the first identification information to the primary device on different frequencies or channels. For example, the secondary device T1 and the secondary device T2 may send the first identification information to the primary device on the first frequency or a first channel, and the secondary device T3 and the secondary device T4 may send the first identification information to the primary device on the second frequency or a second channel. The first frequency and the second frequency may be preconfigured, and the first frequency is different from the second frequency. The first channel and the second channel may be preconfigured, and the first channel is different from the second channel.

Step 703: The primary device selectively resends the first data packet based on the plurality of pieces of first identification information.

If any one of the plurality of pieces of first identification information received by the primary device indicates that the corresponding secondary device fails to receive the corresponding first data, the primary device may resend the first data packet. If the plurality of pieces of first identification information indicate that the corresponding secondary devices successfully receive the corresponding first data, the primary device may send a second data packet to the plurality of secondary devices, or when no new data needs to be sent, the primary device may suspend sending data to the plurality of secondary devices. The first data packet may be different from the second data packet.

For example, with reference to FIG. 8, after receiving the first identification information from the secondary device T1 to the secondary device T4, the primary device may parse the first identification information. If the plurality of pieces of identification information include identification information including the second character, the primary device may resend the first data packet to the plurality of secondary devices. For example, if the first identification information of the secondary device T1 includes the second character, and the first identification information of the secondary devices T2 to T4 includes the first character, the primary device needs to resend the first data packet to the secondary device T1 to the secondary device T4.

According to the technical solution in FIG. 7, the primary device may send data to the plurality of secondary devices at the same time. Each secondary device may further feed back a data receiving status to the primary device. In this way, the primary device may determine the data receiving status of each secondary device based on the data receiving status fed back by the secondary device. Therefore, reliability of data transmission between the primary device and the secondary devices is ensured. In addition, the primary device may selectively resend the data based on the data receiving status fed back by each secondary device. Compared with the conventional technology, this can reduce signaling overheads.

In an example, compared with the technical solution in FIG. 4, the technical solution provided in this embodiment of this application can reduce a duty cycle. The duty cycle may be a ratio of data transmission time in a subevent to a configured time period.

Figure 9:
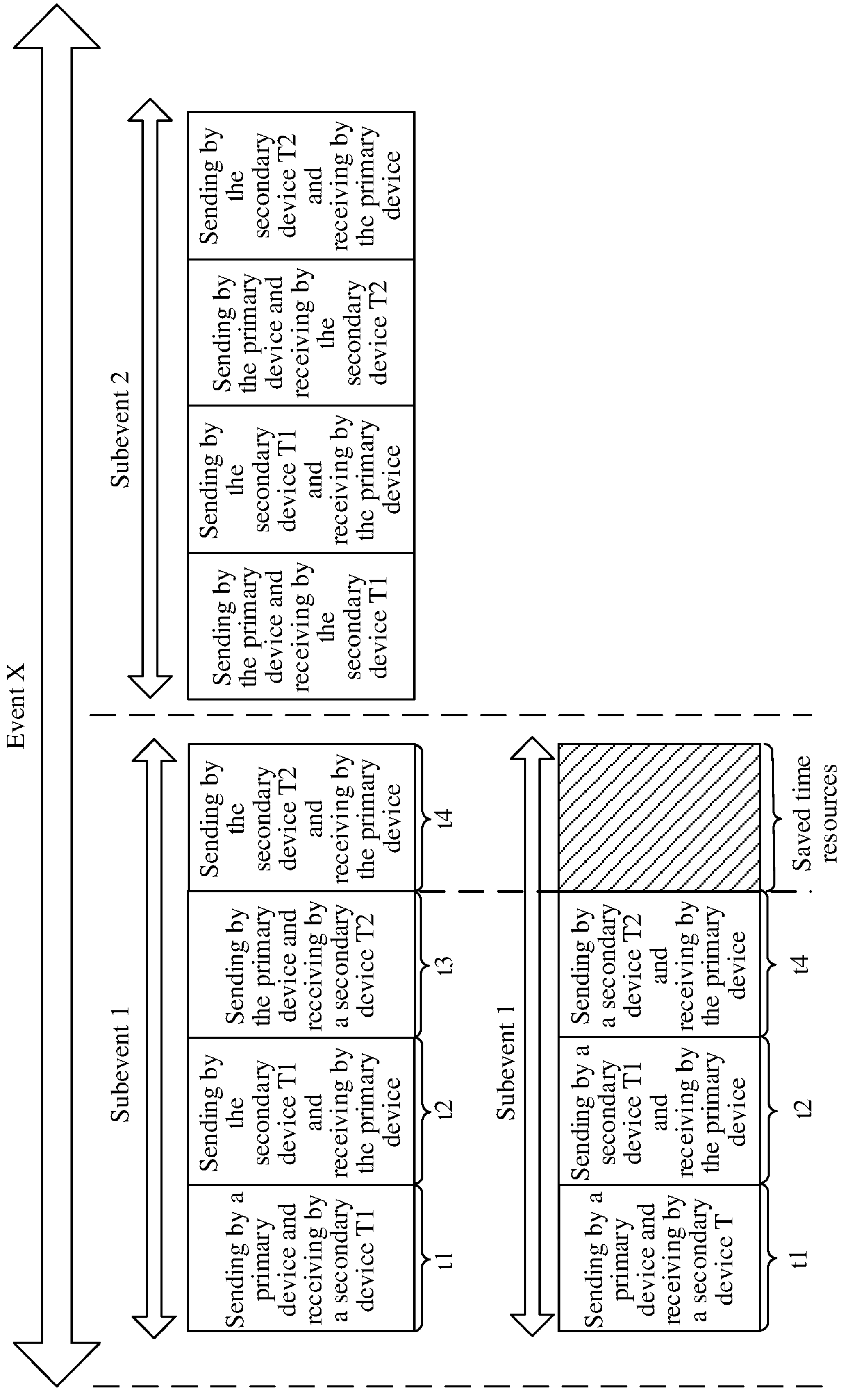
FIG. 9 is a flowchart of a data transmission method applied to short-range wireless communication according to an embodiment of this application.

For example, as shown in FIG. 9, in the technical solution provided in this embodiment of this application, a time period configured for a subevent 1 is t. When there are two secondary devices, in the technical solution in FIG. 4, a duty cycle of the subevent 1 may be (t1+t2+t3+t4)/t. In this embodiment of this application, because the primary device may simultaneously send data to the secondary device T1 and the secondary device T2, a quantity of times that the primary device sends the data to the secondary devices and time in which the primary device sends the data to the secondary devices are reduced. In other words, a duty cycle of the subevent 1 may be (t1+t2+t4)/t<(t1+t2+t3+t4)/t. Therefore, the technical solution provided in this embodiment of this application can reduce the duty cycle.

Figure 10:
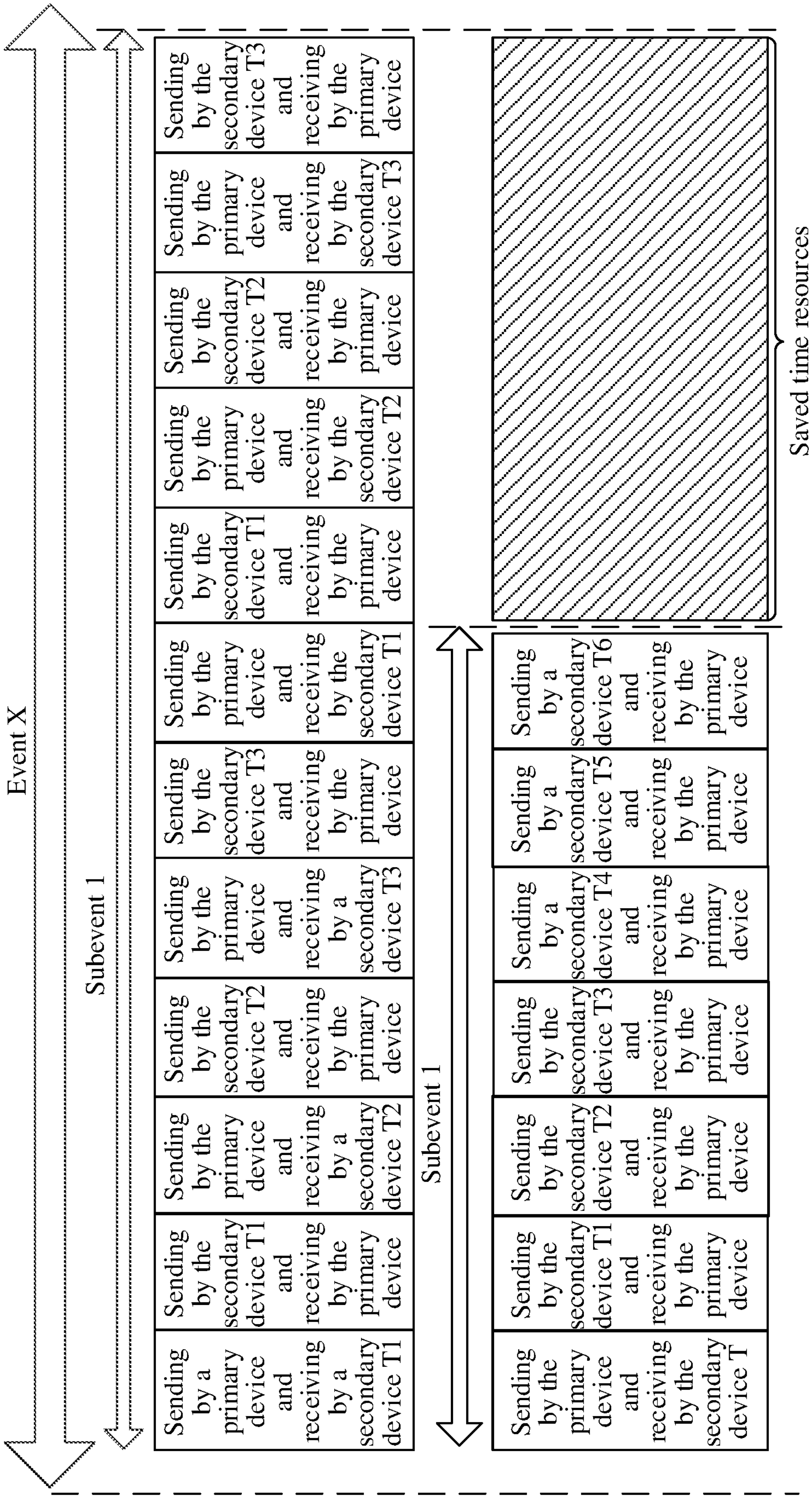
FIG. 10 is a flowchart of a data transmission method applied to short-range wireless communication according to an embodiment of this application.

Further, as shown in FIG. 10, when there are a large quantity of secondary devices, for example, six secondary devices, the primary device may simultaneously send data to the secondary device T1 to a secondary device T6. In the subevent 1, in the technical solution in FIG. 4, the primary device needs to send the data six times. However, in the technical solution in this embodiment of this application, the primary device needs to send the data only once. Therefore, the primary device can greatly reduce a quantity of times of sending the data and time for sending the data, to reduce the duty cycle.

Figure 11:
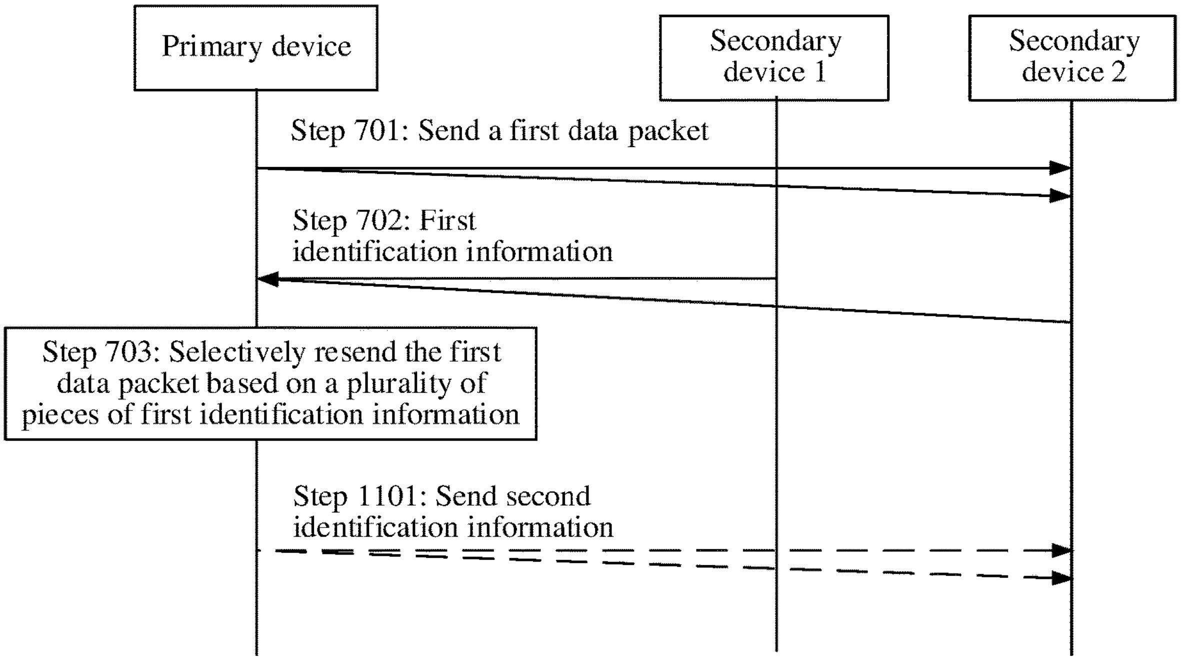
FIG. 11 is a flowchart of a data transmission method applied to short-range wireless communication according to an embodiment of this application.

In a possible implementation, as shown in FIG. 11, to implement reliability of two-way communication between the primary device and the secondary devices, the method provided in this embodiment of this application may further include the following steps.

Step 1101: The primary device sends second identification information to the plurality of secondary devices.

The second identification information may indicate whether the primary device successfully receives the first identification information. Specifically, for the second identification information, refer to the foregoing descriptions of the first identification information. Details are not described again.

In an example, after receiving the first identification information of the secondary devices, the primary device may send the second identification information to the secondary devices. In this case, the second identification information may indicate that the primary device has received the first identification information.

In another example, the primary device may send the second identification information to the plurality of secondary devices based on first preset time. A length of the first preset time may be greater than a sum of second slots corresponding to the plurality of secondary devices. In other words, after sending the first data packet to the plurality of secondary devices, the primary device may send the second identification information to the plurality of secondary devices after the first preset time.

The second identification information may include identifiers of the secondary devices corresponding to the first identification information received by the primary device. For example, the secondary device T1 and the secondary device T2 respectively feed back the first identification information to the primary device on the second slots. If the primary device receives only the first identification information of the secondary device T1 and the secondary device T2, but does not receive the first identification information of the secondary device T3 and the secondary device T4, the primary device may send the second identification information to the secondary device T1 to the secondary device T4. The second identification information may include identifiers of the secondary device T1 and the secondary device T2, and indicates that the primary device successfully receives the first identification information of the secondary device 1 and the secondary device 2, but has not received the first identification information of the secondary device T3 and the secondary device T4.

In another example, after the secondary devices send the first identification information to the primary device, if the secondary device has not received the second identification information of the primary device within second preset time, the secondary device may resend the first identification information to the primary device.

Further, to reduce signaling overheads, in this embodiment of this application, if a quantity of times that the secondary device resends the first identification information exceeds a preset quantity of times within a preset time period, the secondary devices may stop sending the first identification information to the primary device.

In another example, when the secondary devices send the second data to the primary device, the primary device may feed back one piece of identification information to the secondary devices. The identification information may further indicate whether the primary device successfully receives the second data. For details, refer to the foregoing descriptions of the first identification information.

When the second data may be carried in the first identification information, the identification information may be the second identification information. In other words, the second identification information may indicate whether the primary device successfully receives the first identification information and the second data. When the second data is independent information, the primary device may feed back the second identification information to the corresponding secondary devices, and then may further feed back third identification information to the corresponding secondary devices. The third identification information may indicate whether the primary device successfully receives the second data.

In another example, if the primary device does not receive the identification information from the secondary devices within preset time, or a quantity of times that the primary device resends the first data packet exceeds a preset quantity of times, the primary device may delete the first data packet or may stop sending the first data packet to the plurality of secondary devices.

It should be noted that in the technical solutions in FIG. 7 and FIG. 11, all information exchanged between the primary device and the one or more secondary devices may be encrypted. For example, the first data packet, the second identification information, and the second data packet that are sent by the primary device to the one or more secondary devices may all be encrypted by using a first preset password. The first identification information and the second data that are sent by the secondary devices to the primary device may also be encrypted by using a second preset password. The first preset password may be preconfigured for the primary device. The second preset password may be preconfigured for the plurality of secondary devices. The first preset password may be the same as or different from the second preset password. A decryption key corresponding to the second preset password is preconfigured for the primary device. A decryption key corresponding to the first preset password may be preconfigured for the plurality of secondary devices. In this way, data transmission security can be improved.

The solutions in the foregoing embodiments of this application may be combined on a premise that the solutions are not contradictory.

In the foregoing embodiments provided in this application, the method provided in embodiments of this application is described from a perspective of interaction between the primary device and the secondary devices. It may be understood that to implement functions in the method provided in the foregoing embodiments of this application, network elements such as the primary device and the secondary devices include corresponding hardware structures and/or software modules for performing the functions. A person of ordinary skill in the art should easily be aware that, in combination with algorithms and steps in the examples described in embodiments disclosed in this specification, this application can be implemented by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, function modules of the primary device and the secondary devices may be obtained through division according to the foregoing method examples. For example, the function modules may be obtained through division based on corresponding functions, or two or more functions may be integrated into a processing module. The integrated module may be implemented in a form of hardware, or may be implemented in a form of a software function module. It should be noted that in embodiments of this application, module division is an example, and is merely logical function division. During actual implementation, another division manner may be used.

Figure 12:
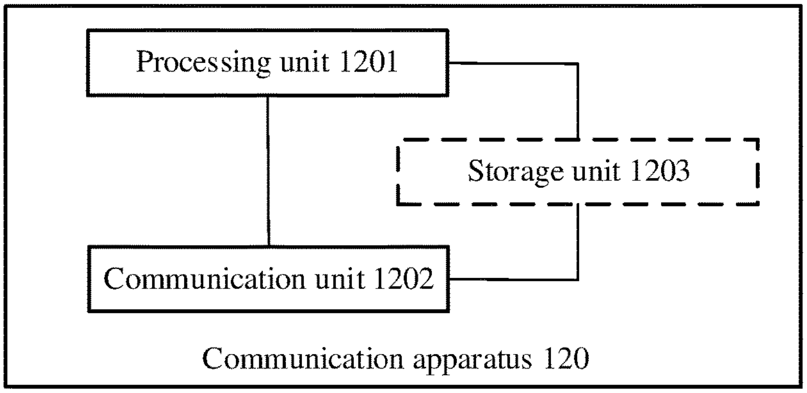
FIG. 12 is a schematic structural diagram of a communication apparatus 120 according to an embodiment of this application.

When an integrated unit is used, FIG. 12 is a possible schematic structural diagram of a communication apparatus (denoted as a communication apparatus 120) in the foregoing embodiments. The communication apparatus 120 includes a communication unit 1202 and a processing unit 1201, and may further include a storage unit 1203. The schematic structural diagram shown in FIG. 12 may be used to show a structure of the primary device in the foregoing embodiments.

When the schematic structural diagram shown in FIG. 12 is used to show the structure of the primary device in the foregoing embodiments, the processing unit 1201 is configured to control and manage actions of a terminal device. For example, the processing unit 1201 performs step 703 in FIG. 7, and the communication unit 1202 performs step 701 in FIG. 7, step 1101 in FIG. 11, and/or an action performed by the primary device in another process described in embodiments of this application. The processing unit 1201 may communicate with another network entity through the communication unit 1202, for example, communicate with the secondary device 1 shown in FIG. 5. The storage unit 1203 is configured to store program code and data of the primary device.

When the schematic structural diagram shown in FIG. 12 is used to show the structure of the primary device in the foregoing embodiments, the communication apparatus 120 may be the primary device, or may be a chip in the primary device.

When the communication apparatus 120 is the primary device, the processing unit 1201 may be a processor or a controller, and the communication unit 502 may be a communication interface, a transceiver, a transceiver machine, a transceiver circuit, a transceiver apparatus, or the like. The communication interface is a general term, and may include one or more interfaces. The storage unit 1203 may be a memory. When the communication apparatus 120 is a chip in a terminal device, the processing unit 1201 may be a processor or a controller, and the communication unit 1202 may be an input interface and/or an output interface, a pin, a circuit, or the like. The storage unit 1203 may be a storage unit (for example, a register or a cache) in the chip, or may be a storage unit (for example, a read-only memory (ROM) or a random access memory (RAM) that is in the terminal device and that is located outside the chip.

Figure 13:
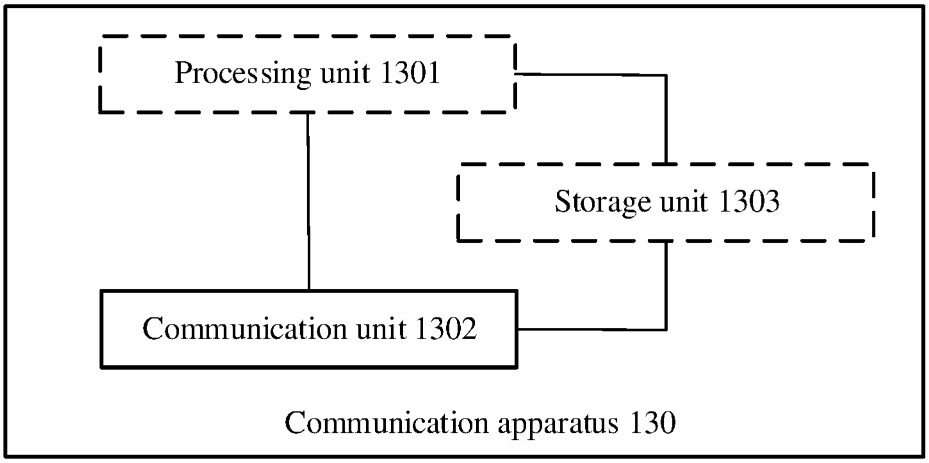
FIG. 13 is a schematic structural diagram of a communication apparatus 130 according to an embodiment of this application.

When an integrated unit is used, FIG. 13 is a possible schematic structural diagram of a communication apparatus (denoted as a communication apparatus 130) in the foregoing embodiments. The communication apparatus 130 includes a communication unit 1302, and may further include a processing unit 1301 and a storage unit 1303. The schematic structural diagram shown in FIG. 13 may be used to show a structure of the secondary device in the foregoing embodiments.

When the schematic structural diagram shown in FIG. 13 is used to show the structure of the secondary device in the foregoing embodiments, the processing unit 1301 is configured to control and manage actions of the secondary device through the communication unit 1302. For example, the processing unit 1301 is configured to perform, through the communication unit 1302, step 702 in FIG. 7 and/or actions performed by the secondary device in another process described in embodiments of this application. The processing unit 1301 may communicate with another entity through the communication unit 1302, for example, communicate with the primary device shown in FIG. 5. The storage unit 1303 is configured to store program code and data of the primary device.

When the schematic structural diagram shown in FIG. 13 is used to show the structure of the secondary device in the foregoing embodiments, the communication apparatus 130 may be the secondary device, or may be a chip in the secondary device.

When the communication apparatus 130 is the secondary device, the processing unit 1301 may be a processor or a controller, and the communication unit 1302 may be a communication interface, a transceiver, a transceiver machine, a transceiver circuit, a transceiver apparatus, or the like. The communication interface is a general term, and may include one or more interfaces. The storage unit 1303 may be a memory. When the communication apparatus 130 is the chip in the secondary device, the processing unit 1301 may be a processor or a controller, and the communication unit 1302 may be an input interface and/or an output interface, a pin, a circuit, or the like. The storage unit 1303 may be a storage unit (for example, a register or a cache) in the chip, or may be a secondary device or a storage unit (for example, a read-only memory (ROM) or a random access memory (RAM) that is in the secondary device and that is located outside the chip.

The communication unit may also be referred to as a transceiver unit. An antenna and a control circuit that have a receiving and sending function in each of the communication apparatus 120 and the communication apparatus 130 may be considered as the communication unit of the communication apparatus, and a processor having a processing function may be considered as the processing unit of the communication apparatus. Optionally, a component that is in the communication unit and that is configured to implement the receiving function may be considered as a receiving unit. The receiving unit is configured to perform a receiving step in embodiments of this application. The receiving unit may be a receiver machine, a receiver, a receiver circuit, or the like. A component that is in the communication unit and that is configured to implement the sending function may be considered as a sending unit. The sending unit is configured to perform a sending step in embodiments of this application. The sending unit may be a transmitter machine, a transmitter, a transmitter circuit, or the like.

When the integrated unit in each of FIG. 12 and FIG. 13 is implemented in a form of a software function module and sold or used as an independent product, the integrated unit may be stored in a computer-readable storage medium. Based on such an understanding, the technical solutions of embodiments of this application essentially, or a part contributing to the conventional technology, or all or some of the technical solutions, may be implemented in a form of a software product. The computer software product is stored in a storage medium and includes several instructions for instructing a computer device (which may be a personal computer, a server, a network device, or the like) or a processor to perform all or some of the steps of the methods described in embodiments of this application. The storage medium for storing the computer software product includes: any medium that can store program code, such as a USB flash drive, a removable hard disk, a read-only memory, a random access memory, a magnetic disk, or an optical disc.

The units in FIG. 12 and FIG. 13 may also be referred to as modules. For example, the processing unit may be referred to as a processing module.

Figure 14:
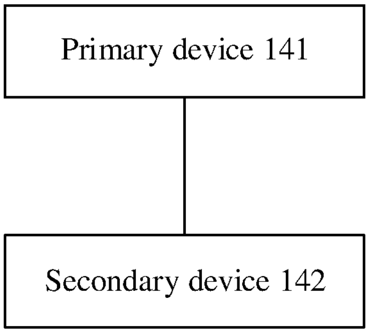
FIG. 14 is a schematic structural diagram of a communication system according to an embodiment of this application.

FIG. 14 is an example diagram of a communication system according to an embodiment of this application. The communication system includes a primary device 141 and a secondary device 142.

The primary device 141 is configured to perform an action performed by the primary device in the foregoing embodiments. For example, the primary device 141 is configured to perform step 701 and step 703 in FIG. 7, and step 1101 in FIG. 11.

The secondary device 142 is configured to perform an action performed on the secondary device in the foregoing embodiments. For example, the secondary device 142 is configured to perform step 702 in FIG. 7.

In an implementation process, the steps in the methods provided in the embodiments may be completed through an integrated logic circuit of hardware in the processor, or according to instructions in a form of software. The steps of the method disclosed with reference to embodiments of this application may be directly performed by a hardware processor, or may be performed by a combination of hardware in the processor and a software module.

The processor in this application may include but is not limited to at least one of the following: a central processing unit (CPU), a microprocessor, a digital signal processor (DSP), a microcontroller unit (MCU), or a computing device for running software such as an artificial intelligence processor. Each computing device may include one or more cores for executing software instructions to perform operations or processing. The processor may be an independent semiconductor chip, or may be integrated with another circuit into a semiconductor chip. For example, the processor may form a SoC (system-on-a-chip) with another circuit (such as a codec circuit, a hardware acceleration circuit, or various buses and interface circuits). Alternatively, the processor may be integrated into an ASIC as a built-in processor of the ASIC, and the ASIC integrated with the processor may be separately packaged, or may be packaged with another circuit. In addition to the cores for executing software instructions to perform the operations or the processing, the processor may further include a necessary hardware accelerator, for example, a field programmable gate array (FPGA), a PLD (programmable logic device), or a logic circuit that implements a dedicated logic operation.

The memory in embodiments of this application may include at least one of the following: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, this is not limited thereto.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing primary device and secondary device.

An embodiment of this application further provides a chip. The chip includes a processor and an interface circuit. The interface circuit is coupled to the processor. The processor is configured to run a computer program or instructions, to implement the foregoing methods. The interface circuit is configured to communicate with another module outside the chip.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device that is integrated by one or more usable media, such as a server or a data center. The usable medium may be a magnetic medium (for example, a floppy disk, a hard disk, or a magnetic tape), an optical medium (for example, a DVD), a semiconductor medium (for example, a solid-state drive (SSD), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and the accompanying drawings are merely example descriptions of this application defined by the accompanying claims, and are considered as any of or all modifications, variations, combinations, or equivalents that cover the scope of this application. It is clearly that a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:

1. A method for data transmission, comprising:

sending a first data packet to a plurality of first secondary devices, wherein the first data packet comprises at least one piece of first data corresponding to the plurality of first secondary devices;

receiving a plurality of pieces of first identification information respectively fed back by the plurality of first secondary devices, wherein each first identifier in a respective piece of first identification information indicates whether a corresponding first secondary device successfully receives a corresponding piece of first data from the first data packet;

selectively resending the first data packet based on the plurality of pieces of first identification information; and separately sending second identification information to the plurality of first secondary devices, wherein each second identifier in a respective second identification information indicates whether a primary device successfully receives first identification information of a corresponding first secondary device.

2. The method according to claim 1, wherein the sending a first data packet to a plurality of first secondary devices comprises:

sending the first data packet to the plurality of first secondary devices in a first slot in an event period.

3. The method according to claim 2, wherein the receiving a plurality of pieces of first identification information respectively fed back by the plurality of first secondary devices comprises:

receiving the plurality of pieces of first identification information in a plurality of second slots in the event period in a time division manner.

4. The method according to claim 3, wherein at least one of second slots, frequencies, or channels corresponding to first identification information of adjacent first secondary devices is preconfigured.

5. The method according to claim 1, wherein the selectively resending the first data packet based on the plurality of pieces of first identification information comprises:

resending the first data packet when any piece of first identification information indicates that a corresponding first secondary device fails to receive target data, wherein the target data is a piece of first data that is in the first data packet and that corresponds to the corresponding first secondary device; and sending a second data packet when the plurality of pieces of first identification information indicate that corresponding first secondary devices successfully receive the target data.

6. The method according to claim 1, wherein:

when data corresponding to the plurality of first secondary devices is the same, the first data packet comprises one piece of first data; or when data corresponding to the plurality of first secondary devices is different, the first data packet comprises a plurality of pieces of first data respectively corresponding to the plurality of first secondary devices.

7. The method according to claim 1, wherein the method further comprises:

sending the first data packet to a second secondary device, wherein the first data packet further comprises a null packet corresponding to the second secondary device, and the null packet is used to maintain a communication connection to the second secondary device.

8. A method for data transmission, comprising:

receiving a first data packet from a primary device in a first slot in an event period, wherein the first data packet comprises at least one piece of first data corresponding to a plurality of first secondary devices;

feeding back first identification information to the primary device in any one of second slots in the event period, wherein a first identifier in the first identification information indicates whether the first secondary device successfully receives a corresponding piece of first data from the first data packet, and different first secondary devices respectively correspond to different second slots; and receiving second identification information from the primary device, wherein a second identifier in the second identification information indicates whether the primary device has received corresponding first identification information.

9. The method according to claim 8, wherein:

when data corresponding to the plurality of first secondary devices is the same, the first data packet comprises one piece of first data; or when data corresponding to the plurality of first secondary devices is different, the first data packet comprises first data respectively corresponding to the plurality of first secondary devices.

10. The method according to claim 8, wherein the first data packet further comprises a null packet corresponding to a second secondary device, and the null packet is used to maintain a communication connection to the second secondary device.

11. The method according to claim 8, wherein at least one of second slots, frequencies, or channels corresponding to first identification information of adjacent first secondary devices is preconfigured.

12. The method according to claim 8, further comprising:

resending the first identification information to the primary device in response to the second identification information not being received from the primary device within a second preset time after feeding back the first identification information.

13. The method according to claim 12, further comprising:

stopping sending the first identification information to the primary device if a quantity of times that the first secondary device resends the first identification information exceeds a preset quantity of times within a preset time period.

14. An apparatus for communication, wherein the apparatus comprises at least one processor, one or more memories coupled to the at least one processor, and a communication interface coupled to the at least one processor, wherein the one or more memories store programming instructions for execution by the at least one processor to:

send a first data packet to a plurality of first secondary devices through the communication interface, wherein the first data packet comprises at least one piece of first data corresponding to the plurality of first secondary devices;

receive, through the communication interface, a plurality of pieces of first identification information respectively fed back by the plurality of first secondary devices, wherein each first identifier in a respective piece of first identification information indicates whether a corresponding first secondary device successfully receives a corresponding piece of first data from the first data packet;

selectively resend the first data packet based on the plurality of pieces of first identification information; and send second identification information to the plurality of first secondary devices through the communication interface, wherein each second identifier indicates whether the primary device successfully receives first identification information of a corresponding first secondary device.

15. The apparatus according to claim 14, wherein the one or more memories store programming instructions for execution by the at least one processor to:

send the first data packet to the plurality of first secondary devices in a first slot in an event period through the communication interface.

16. The apparatus according to claim 15, wherein the one or more memories store programming instructions for execution by the at least one processor to:

receive the plurality of pieces of first identification information in a plurality of second slots in the event period in a time division manner through the communication interface.

17. The apparatus according to claim 16, wherein at least one of second slots, frequencies, or channels corresponding to first identification information of adjacent first secondary devices is preconfigured.

18. The apparatus according to claim 14, wherein the one or more memories store programming instructions for execution by the at least one processor to:

resend the first data packet through the communication interface when any piece of first identification information indicates that a corresponding first secondary device fails to receive target data, wherein the target data is a piece of first data that is in the first data packet and that corresponds to the corresponding first secondary device; and send a second data packet through the communication interface when the plurality of pieces of first identification information indicate that corresponding first secondary devices successfully receive the target data.

19. The apparatus according to claim 14, wherein:

when data corresponding to the plurality of first secondary devices is the same, the first data packet comprises one piece of first data; or when data corresponding to the plurality of first secondary devices is different, the first data packet comprises a plurality of pieces of first data respectively corresponding to the plurality of first secondary devices.

20. The apparatus according to claim 14, wherein one or more memories store programming instructions for execution by the at least one processor to:

send the first data packet to a second secondary device through the communication interface, wherein the first data packet comprises a null packet corresponding to the second secondary device, and the null packet is used to maintain a communication connection to the second secondary device.

* * * * *